US012800089B2

(12) United States Patent
Sung et al.

(10) Patent No.: US 12,800,089 B2
(45) Date of Patent: Nov. 17, 2026

(54) ANGLE CONTROLLING APPARATUS AND ANGLE CONTROLLING METHOD FOR ELECTRONIC DEVICE

(71) Applicant: SAMSUNG ELECTRONICS CO., LTD., Suwon-si (KR)

(72) Inventors: Giseok Sung, Suwon-si (KR); Sanghoon Eum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 18/608,454

(22) Filed: Mar. 18, 2024

(65) Prior Publication Data

US 2024/0218959 A1 Jul. 4, 2024

Related U.S. Application Data

(63) Continuation of application No. PCT/KR2022/014936, filed on Oct. 5, 2022.

(30) Foreign Application Priority Data

Nov. 26, 2021 (KR) ........................ 10-2021-0165741

(51) Int. Cl.
*F16M 11/10* (2006.01)
*G03B 21/14* (2006.01)

(52) U.S. Cl.
CPC ........... *F16M 11/10* (2013.01); *G03B 21/145* (2013.01)

(58) Field of Classification Search
CPC .... F16M 11/10; F16M 11/18; F16M 11/2014; F16M 13/027; G03B 21/145; G03B 21/14; F16H 1/16; H04N 9/3141; H04N 9/3173
(Continued)

(56) References Cited

U.S. PATENT DOCUMENTS 5,788,355 A 8/1998 Na
9,405,176 B2 8/2016 Kinebuchi et al.
(Continued)

FOREIGN PATENT DOCUMENTS

CN 111550701 A 8/2020
EP 2 963 330 A1 1/2016
(Continued)

OTHER PUBLICATIONS

International Search Report (PCT/ISA/210) issued by the International Searching Authority on Feb. 10, 2023 in International Application No. PCT/KR2022/014936.
(Continued)

*Primary Examiner* — Xi Wang
(74) *Attorney, Agent, or Firm* — Sughrue Mion, PLLC

(57) ABSTRACT

An angle controlling apparatus includes: an electronic device; a housing including upper housing and lower housings; a bracket inside the housing; a first motor inside the housing and configured to generate power for rotating the bracket; a first one-way transmission member connecting the bracket and the first motor to transmit the power generated by the first motor to the bracket, and prevent a force acting on the bracket from being transmitted to the first motor; a second motor inside the housing and configured to generate power for rotating the lower housing in left and right directions; and a second one-way transmission member connecting the lower housing and the second motor to transmit the power generated by the second motor to the lower housing to allow the lower housing to rotate, and prevent a force acting on the lower housing from being transmitted to the second motor.

20 Claims, 16 Drawing Sheets

(58) Field of Classification Search
USPC ............................... 248/299.1; 396/428, 427
See application file for complete search history.

(56) References Cited

U.S. PATENT DOCUMENTS

| | | | | |
|---|---|---|---|---|
| 2009/0002646 | A1 | 1/2009 | Fu et al. | |
| 2011/0268433 | A1* | 11/2011 | Yim | H04N 7/185 396/428 |
| 2012/0086914 | A1* | 4/2012 | Furihata | G03B 31/04 353/121 |
| 2017/0254469 | A1 | 9/2017 | Okamura et al. | |
| 2019/0121522 | A1 | 4/2019 | Davis et al. | |
| 2020/0292923 | A1* | 9/2020 | Amano | G03B 21/142 |

FOREIGN PATENT DOCUMENTS

| | | | |
|---|---|---|---|
| JP | 2005-181634 | A | 7/2005 |
| JP | 2011-232474 | A | 11/2011 |
| KR | 10-0204208 | B1 | 6/1999 |
| KR | 20-0303321 | Y1 | 3/2003 |
| KR | 10-0539553 | B1 | 12/2005 |
| KR | 10-2007-0114458 | A | 12/2007 |
| KR | 10-0884410 | B1 | 2/2009 |
| KR | 20-2010-0005933 | U | 6/2010 |
| KR | 10-1488082 | B1 | 2/2015 |

OTHER PUBLICATIONS

Written Opinion (PCT/ISA/237) issued by the International Searching Authority on Feb. 10, 2023 in International Application No. PCT/KR2022/014936.
Communication issued Nov. 11, 2024 by the European Patent Office in European patent Application No. 22898825.9.
Communication issued May 27, 2025 by the European Patent Office in European Patent Application No. 22 898 825.9.
Communication dated Jul. 21, 2026 issued by the Korean Ministry of Intellectual Property in Korean Patent Application No. 10-2021-0165741.

* cited by examiner

ANGLE CONTROLLING APPARATUS AND ANGLE CONTROLLING METHOD FOR ELECTRONIC DEVICE

CROSS-REFERENCE TO RELATED APPLICATIONS

This application is a continuation of International Application No. PCT/2022/014936, filed on Oct. 5, 2022, which is based on and claims priority to Korean Patent Application No. 10-2021-0165741, filed on Nov. 26, 2021, in the Korean Intellectual Property Office, the disclosures of which are incorporated by reference herein in their entireties.

BACKGROUND

1. Field

The disclosure relates to an angle controlling apparatus and an angle controlling method, and more particularly, to an angle controlling apparatus and an angle controlling method in which an angle may be adjusted by an actuator through a one-way transmission member, but an angle of the actuator may not be adjusted by an external force.

2. Description of Related Art

Electronic devices require angle adjustment to display a desired output at a desired position. In a case where the electronic device is a projector, angle adjustment is required to project a beam of light to a desired position in order to allow a user to view an image.

Such a projector is an image display apparatus that projects image information onto an external screen.

Early projectors were equipped with an illumination system and a projection system, and separate image materials were provided in the form of films to allow a user to view desired image materials while replacing the desired image materials. However, recent projectors are equipped with an image system using a display module, which allows desired images to be viewed by connecting a computer or image player. In this case, an image is implemented in the image system (i.e., the display module) based on image information provided by a device such as a computer or an image player. Also, an illumination system provides light beams to the display module, which implements images but does not generate light by itself. A projection image is formed as the light beams pass through the display module, and the formed projection image is enlarged by passing through a projection system and is projected onto a screen placed at a suitable distance.

Recently, as small display devices such as a transmissive liquid crystal display (LCD) and a digital micromirror device (DMD) are used, projectors have gradually become smaller, lighter, and more portable. Such portable projectors are useful for people who frequently work outdoors and have meetings.

SUMMARY

Provided is an angle controlling apparatus and an angle controlling method of an electronic device that, once an angle has been adjusted to a desired position, the electronic device may maintain a corresponding angle without requiring a separate control.

Further, provided is an angle controlling apparatus and an angle controlling method of an electronic device that may be economical.

Further still, provided is an angle controlling apparatus that may have a longer service life and an angle controlling method of an electronic device.

Additional aspects will be set forth in part in the description which follows and, in part, will be apparent from the description, or may be learned by practice of the presented embodiments.

According to an aspect of the disclosure, an angle controlling apparatus includes: a housing including an upper housing and a lower housing; a bracket inside the housing and configured to be coupled to an electronic device; a first motor inside the housing and configured to generate power for rotating the bracket in a vertical direction; a first one-way transmission member connecting the bracket and the first motor, the first one-way transmission member being configured to: transmit the power for rotating the bracket in the vertical direction from the first motor to the bracket, and in a state in which a first force is acting on the bracket, prevent the first force from being transmitted to the first motor; a second motor inside the housing and configured to generate power for rotating the lower housing in left and right directions; and a second one-way transmission member connecting the lower housing and the second motor, the second one-way transmission member being configured to: transmit the power for rotating the lower housing in the left and right directions generated by the second motor to the lower housing, and in a state in which a second force is acting on the lower housing, prevent the second force from being transmitted to the second motor.

The first motor may include a rotation shaft, and the first one-way transmission member may include: a first worm coupled to the rotation shaft of the first motor; and a first worm wheel engaged with the first worm.

The first one-way transmission member may further include a bracket gear coupled to the bracket and configured to transmit power transmitted from the first worm wheel to the bracket.

An outer circumferential surface of the bracket gear may be adjacent to an inner surface of the housing.

The angle controlling apparatus may further include a first connection gear engaged with the bracket gear, and the first worm wheel and the first connection gear may have a same rotation axis.

A radius of the first connection gear may be smaller than a radius of the bracket gear.

The first worm may have a rotation axis in a forward and backward direction, and the first worm wheel may have a rotation axis in a left and right direction.

The angle controlling apparatus may further include a base plate inside the housing, the bracket may be rotatably coupled to the base plate, the first motor may be between the base plate and the bracket, and the bracket gear may be adjacent to an outer surface of the bracket.

The upper housing may be adjacent to the outer surface of the bracket, and the lower housing may be adjacent to an outer circumference of the bracket gear.

The second motor may include a rotation shaft; and the second one-way transmission member may include: a second worm coupled to the rotation shaft of the second motor; a second worm wheel engaged with the second worm; a housing gear coupled to the lower housing and configured to transmit power transmitted from the second worm wheel to the lower housing; and a second connection gear engaged with the housing gear, the second connection gear and the second worm wheel having a same rotation axis.

The housing gear may include a coupling hole passing through from an upper side of the housing gear to a lower side of the housing gear, the lower housing may include a cylinder guide protruding upward, the cylinder guide may include a surface facing the housing gear that has a protrusion hole at a position corresponding to the coupling hole, and the angle controlling apparatus may further include a coupling protrusion received in the coupling hole and the protrusion hole so as to couple the housing gear and the lower housing.

The housing gear may be below the base plate, the base plate may be rotatably coupled to the bracket and may include a support protrusion protruding downward, and an outer circumferential surface of the housing gear may be adjacent to the support protrusion.

The second worm may have a rotation axis in a forward and backward direction, and the second worm wheel may have a rotation axis in the vertical direction.

The angle controlling apparatus may further include: a support cylinder coupled to the base plate, the support cylinder and the lower housing having a same rotation axis; a first bearing between an outer side of the support cylinder and the housing gear; and a second bearing spaced apart from the first bearing, and between the outer side of the support cylinder and the lower housing.

The bracket may include a bracket protrusion protruding out of the housing and configured to be coupled to the electronic device, the upper housing has a rotation hole having an angle greater than or equal to an angle at which the bracket protrusion rotates, and the angle controlling apparatus may further include a cover portion coupled to the bracket protrusion and covering the rotation hole.

According to an aspect of the disclosure, an angle controlling apparatus includes: a projector; a bracket coupled to the projector; a motor configured to generate power for rotating the bracket; a motor driver configured to supply a driving current to the motor; a one-way transmission member connecting the bracket and the motor, the one-way transmission member being configured to: transmit the power for rotating the bracket generated by the motor to the bracket, and prevent rotation force of the bracket from being transmitted to the motor; and a controller configured to: perform a driving process for rotating the bracket by controlling the motor driver, perform a driving detection process for detecting a result of the driving process, and perform a standby process for limiting power generation of the motor based on a result of the driving detection process.

The controller may be further configured to perform a space detection process for detecting a preset space and rotating the bracket to emit a preset beam when the angle controlling apparatus is located in the preset space.

The controller may be further configured to perform a location detection process for rotating the bracket to emit a beam to a set position, when the projector is located in a predetermined space.

According to an aspect of the disclosure, an angle controlling method of an electronic device, includes: receiving an input, tilting, using a motor, a bracket coupled to the electronic device based on the received input, panning, using the motor, based on the received input, determining whether the tilting and the panning are performed to an input location, and when the tilting and the panning are performed to the input location, performing standby using a one-way transmission member configured to prevent the motor from being moved by an external force, without separate power consumption of the motor.

The one-way transmission member may include a worm coupled to a rotation shaft of the motor and a worm wheel engaged with the worm, and the standby are performed by the worm and the worm wheel.

According to one or more embodiments, an angle may be adjusted only by an actuator through a one-way transmission member, the angle adjustment may not be made by an external force, and thus the angle may be maintained without separate control once the angle has been adjusted to a desired position.

According to one or more embodiments, by using a one-way transmission member, once an angle has been adjusted to a desired position, an actuator may not be required to be separately controlled, thereby reducing power consumption.

According to one or more embodiments, by using a one-way transmission member, once an angle has been adjusted to a desired position, separate power may not be required for an actuator, allowing a longer service life of the actuator.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
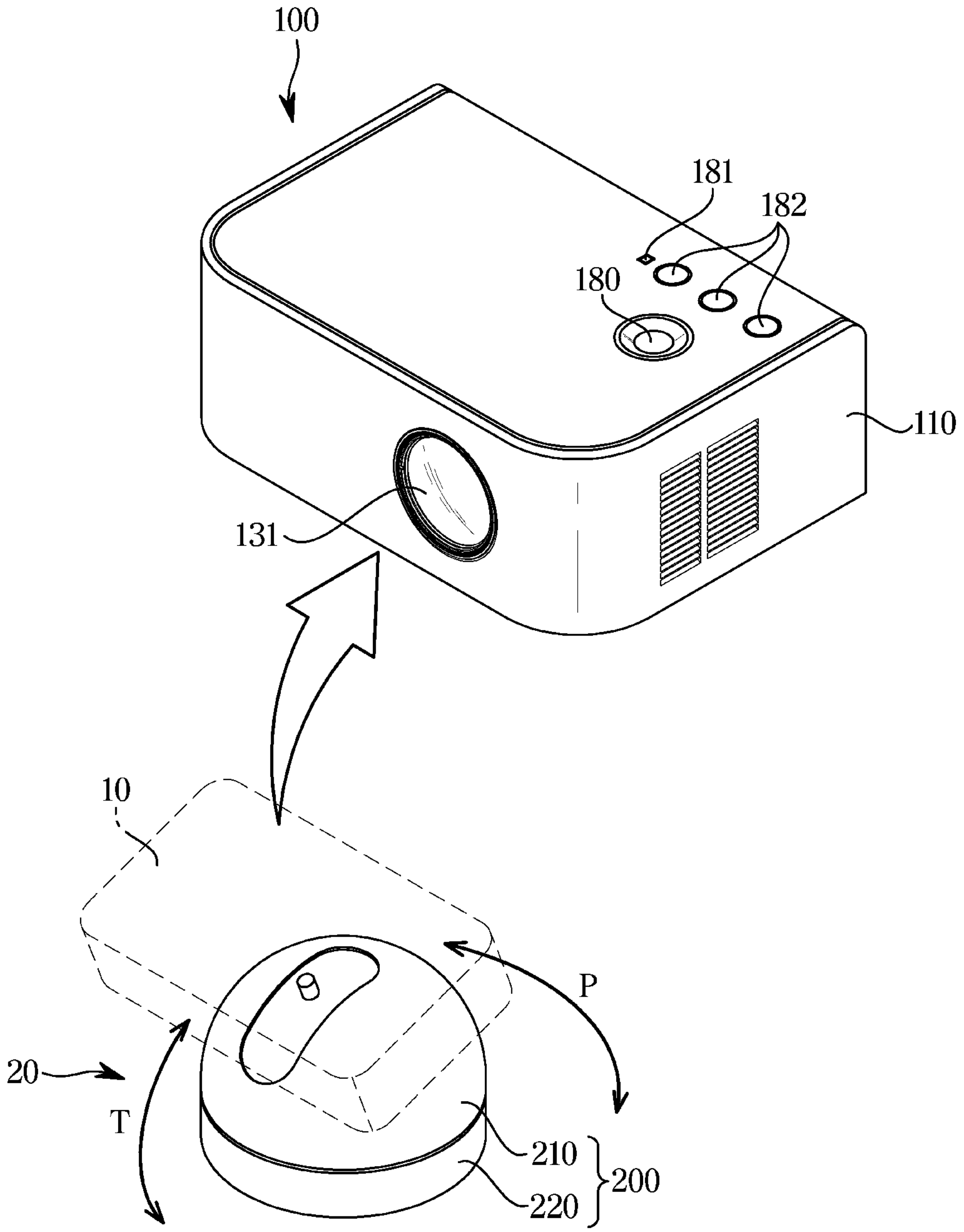
FIG. 1 is a perspective view illustrating an exterior of an angle controlling apparatus according to one or more embodiments.

Hereinafter, example embodiments will be described in detail with reference to the accompanying drawings. When describing the embodiments with reference to the accompanying drawings, like reference numerals refer to like elements and a repeated description related thereto will be omitted.

It should be appreciated that the embodiments described herein are example embodiments, and thus, the disclosure is not limited thereto and embodiments may include various modifications, equivalents, and/or alternatives. Also, like reference numerals or symbols denoted in the drawings of the specification represent members or components that perform the substantially same functions.

Also, the terms used herein are used only to describe particular embodiments and are not intended to limit the disclosure. It is to be understood that the singular forms are intended to include the plural forms as well, unless the context clearly dictates otherwise. It is to be understood that the terms "include" and "have," are intended to indicate the presence of the features, numbers, steps, operations, components, parts, or combinations thereof disclosed in the disclosure, but do not preclude the presence or addition of one or more other elements.

Also, it is to be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

The terms "up and down direction (vertical direction)," "lower" "front and back (forward and backward)," etc., used in the following description are defined based on the drawings, and the shape and position of each component are not limited by these terms.

Throughout the disclosure, the expression "at least one of a, b or c" indicates only a, only b, only c, both a and b, both a and c, both b and c, all of a, b, and c, or variations thereof.

Hereinafter, one or more embodiments are described in detail with reference to the accompanying drawings.

FIG. 1 is a perspective view illustrating an exterior of an angle controlling apparatus 1 according to one or more embodiments.

As shown in FIG. 1, the angle controlling apparatus 1 may include an electronic device 10 to be positioned at a desired angle, and an angle adjustment portion 20 for moving an angle of the electronic device 10.

The angle adjustment portion 20 is not particularly limited. However, the angle adjustment portion 20 may move the electronic device 10 at a desired angle via tilting T, which refers to an up and down movement of the electronic device 10, and panning P which refers to a left and right movement of the electronic device 10.

The electronic device 10 may be a speaker, a projector 100, or the like. When the electronic device 10 is intended to radiate or emit something, the electronic device 10 may be adjusted to a desired angle to emit something to a desired position.

Because the electronic device 10 may be the projector 100, a configuration of the projector 100 is described below. The projector 100 refers to a device that projects an image onto a screen.

The projector 100 may include a projector housing 110 that forms an exterior.

A projection lens 131, through which the projector 100 projects an image, may be positioned on a front surface of the projector housing 110.

An outside of the projector housing 110 may include a power key 180 for powering on the projector 100. An indicator light 181 indicating a current state of the projector 100 may be located on the outside of the projector housing 110. In addition, a function key 182 for performing a preset function may be located on the outside of the projector housing 110.

Hereinafter, a configuration of the projector 100 is described.

Figure 2:
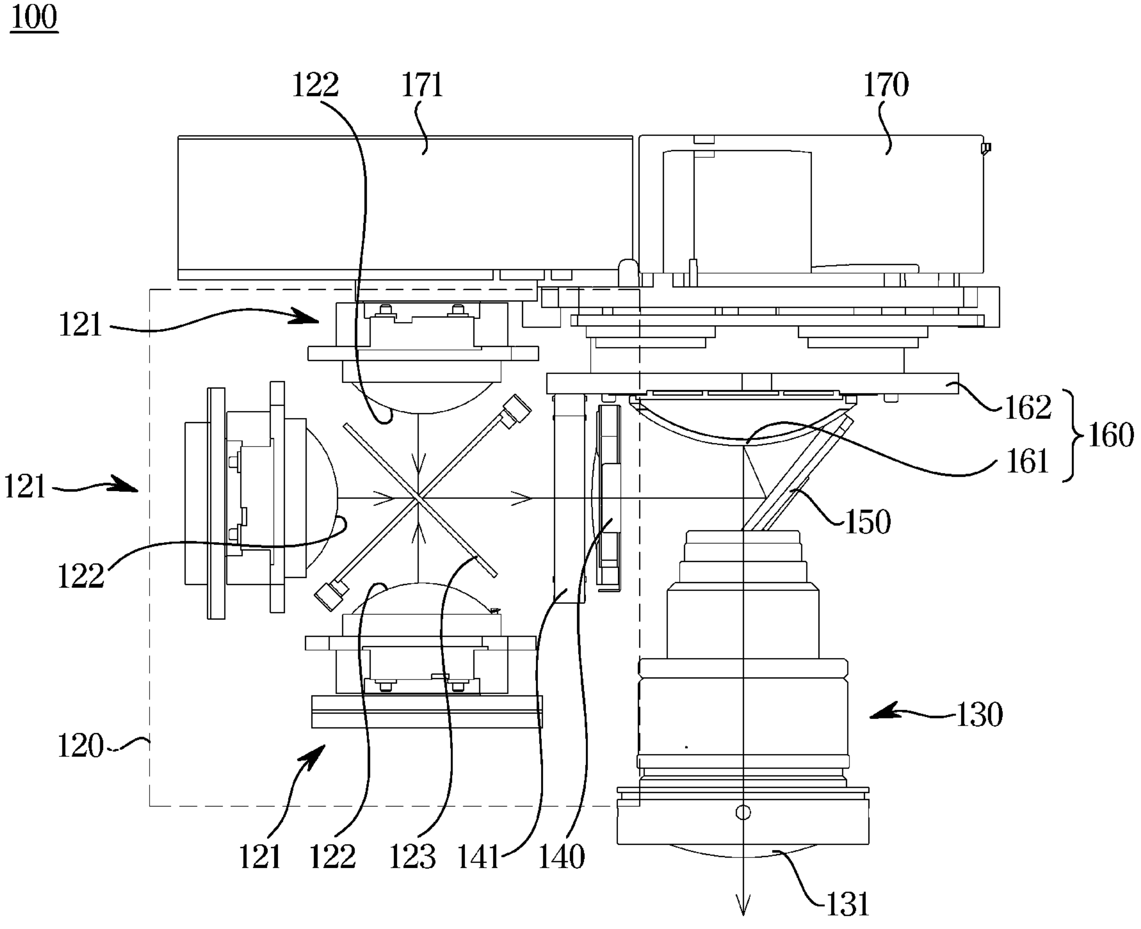
FIG. 2 is a plane view illustrating an interior of a projector, in a case where an electronic device of FIG. 1 is the projector according to one or more embodiments.

FIG. 2 is a plane view illustrating an interior of the projector 100, in a case where the electronic device of FIG. 1 is the projector 100 according to one or more embodiments.

The projector 100 may include an illumination system 120 that generates light and a projection system 130. The illumination system 120 refers to an optical system including optical components from a light source 121 to a display element 162. The illumination system 120 may include the light source 121. The light source 121 may be configured as a light emitter that emits Red (R), Green (G), and Blue (B) light. The light emitter may be configured as a light emitting diode (LED). Here, the light source 121 may emit white light, and in this case, a color separation means is additionally configured to separate the white light into R, G, and B light.

The illumination system 120 may further include a collimator lens 122, a filter 123, a fly-eye lens 141, and a condenser lens 140. The collimator lens 122 may be located in a direction in which light from the light source 121 is emitted. The collimator lens 122 serves to collect light emitted from the light source 121. Light passing through the collimator lens 122 may pass through the filter 123, the fly-eye lens 141, and then the condenser lens 140. Through the above process, the light may be homogenized and focused.

The projector 100 may further include a refractive system 150 and an image system 160.

The refractive system 150 may reflect the light emitted from the illumination system 120 and proceed the light to the image system 160. In this instance, the refractive system 150 may be configured using a volume holographic mirror. The refractive system 150 may have a flat mirror shape.

The light reflected through the refractive system 150 may proceed to the image system 160. The image system 160 may convert an electrical image signal into an optical image using a display module such as a transmissive liquid crystal display or a digital micromirror device (DMD). Because the image system 160 may not generate light itself, the image system 160 may form a projection image by receiving the light emitted from the illumination system 120.

The image system 160 may include the display element 162 including the display module and a relay lens 161 that collects light.

The light through the image system 160 may be projected onto a screen through the projection system 130. The projection system 130 includes a projection lens 131 that magnifies the projection image emitted from the image system 160 and projects the image on the screen. The projection system 130 may be installed to be movable forward and backward in a direction of travel of the projection image to adjust a focus depending on a distance from the screen. Through the above, the image projected onto the screen may be clearly adjusted.

The illumination system 120 may emit light in a direction perpendicular to the direction of travel of the projection image at a side portion between the image system 160 and the projection system 130. The light beam incident on the refractive system 150 may travel perpendicular to the direction of travel of the projection image. The light emitted from the illumination system 120 is incident perpendicular to the refractive system 150, but the refractive system 150 may reflect the light toward the image system 160.

The image system 160 may form the projection image using the light provided through the refractive system 150 and proceed to the projection system 130. The projection image may proceed perpendicular to the direction of travel of the light emitted from the illumination system 120.

The projector 100 may include a heat dissipation fan 170 and a heat dissipation fin 171 to dissipate heat generated inside the projector to the outside of the projector.

With the above configuration, the projector 100 may display desired information by projecting the projection image.

Figure 3:
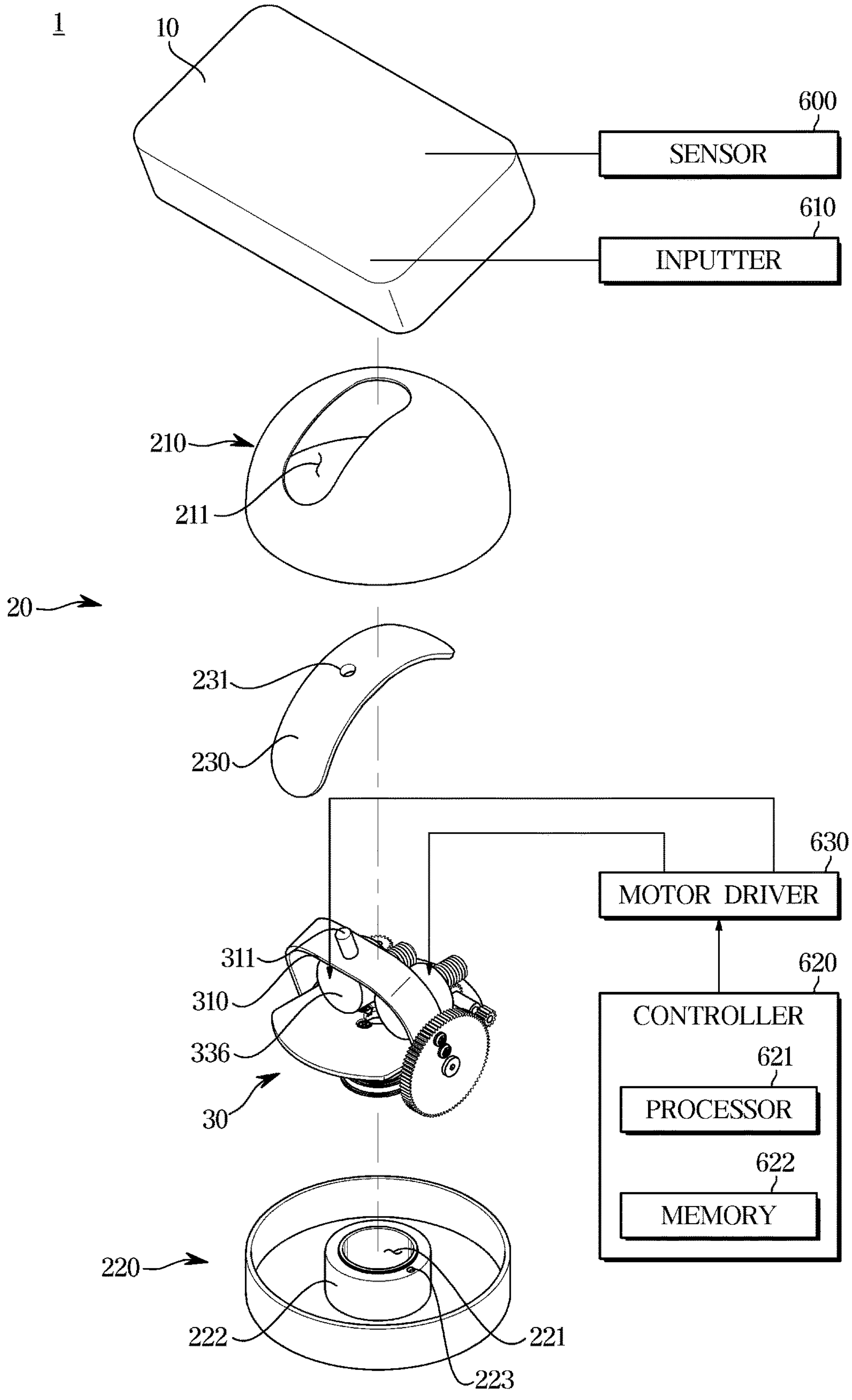
FIG. 3 is an exploded perspective view of the angle controlling apparatus of FIG. 1 according to one or more embodiments.

FIG. 3 is an exploded perspective view of the angle controlling apparatus 1 of FIG. 1 according to one or more embodiments.

As shown in FIG. 3, the angle controlling apparatus 1 may include the electronic device 10 and the angle adjustment portion 20 for adjusting an angle of the electronic device 10.

The electronic device 10 may include an inputter 610 that may signal to move along a preset path or to perform a function, and a sensor 600 that may receive external information.

The angle adjustment portion 20 may include a housing 200 forming an exterior.

The housing 200 may include an upper housing 210 located above and a lower housing 220 located below.

The upper housing 210 may have a hemispherical shape. Because the electronic device 10 may move along an outer surface of the upper housing 210, if the upper housing 210 has a spherical shape, the electronic device 10 may move smoothly along the surface.

An outer surface of the lower housing 220 may extend from the outer surface of the upper housing 210 and have a cylindrical shape. A lower side of the lower housing 220 may be flat. Because the lower side of the lower housing 220 is flat, the angle controlling apparatus 1 may be prevented from falling.

The lower housing 220 may be provided separately from the upper housing 210. Accordingly, rotation of the lower housing 220 may cause the upper housing 210 to rotate relatively.

Other components may be located inside the housing 200. To this end, a space may be provided inside the upper housing 210 and the lower housing 220. Preferably, the upper housing 210 and the lower housing 220 may have a shape of a shell.

Figure 4:
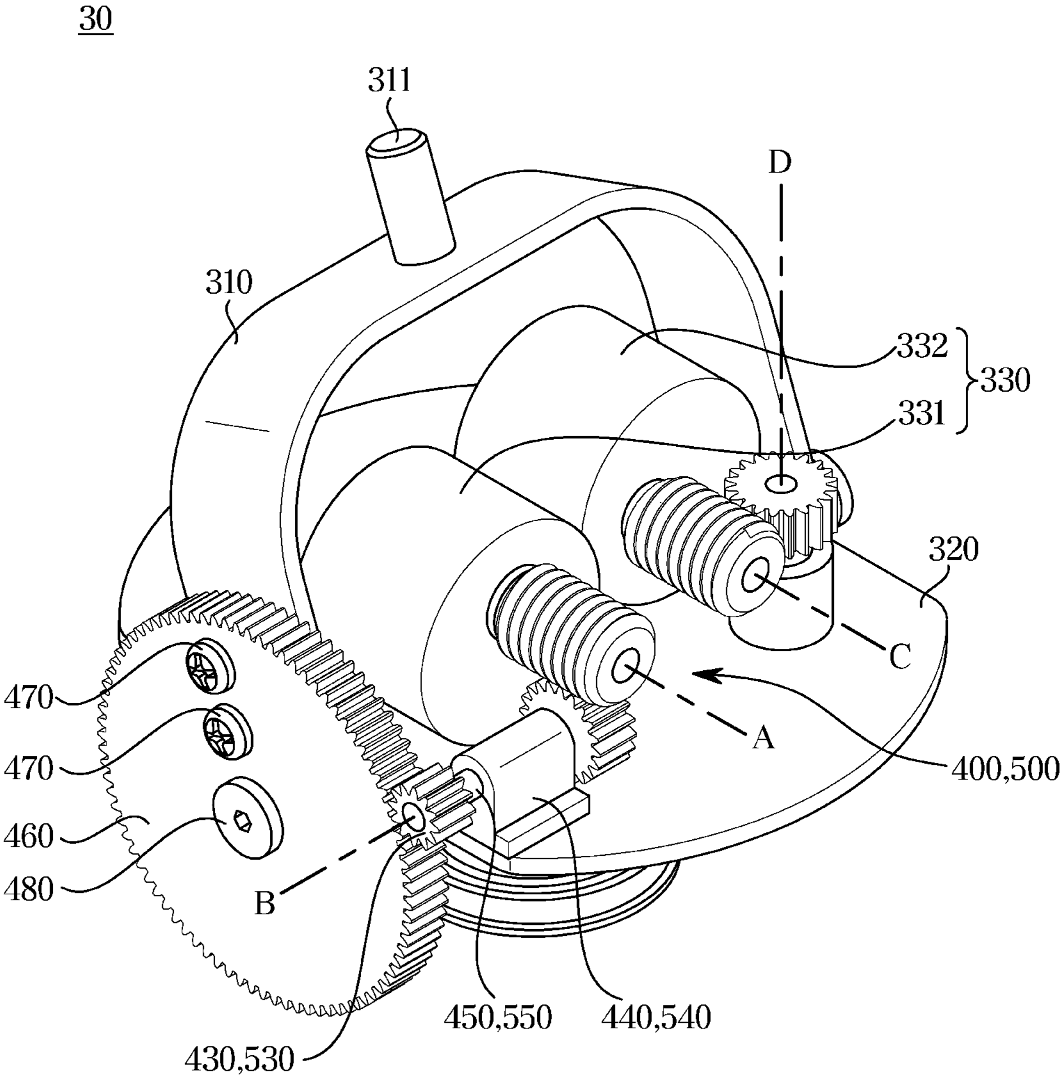
FIG. 4 is a perspective view illustrating a state in which a housing of an angle adjustment portion of FIG. 3 is removed according to one or more embodiments.

An angle adjustment module 30 may be located inside the housing 200. The angle adjustment module 30 may include an actuator 330 generating power. The actuator 330 may be a motor (FIG. 4, 331, 332).

A motor driver 630 for driving the motors 331 and 332 may be connected to the motors 331 and 332. The motor driver 630 may be controlled by a controller 620. The controller 620 may include a processor 621 and a memory 622.

The angle adjustment module 30 may include a bracket 310 that moves with power generated by the actuator 330. A bracket protrusion 311 may be formed on an upper side of the bracket 310. The bracket 310 and the electronic device 10 may be coupled to each other through the bracket protrusion 311. Accordingly, movement of the bracket 310 may allow the electronic device 10 to move.

The electronic device 10 may be provided on the upper housing 210. The electronic device 10 may be located outside the housing 200, and the angle adjustment module 30 may be located inside the housing 200. Because the electronic device 10 may be coupled via the angle adjustment module 30 and the bracket protrusion 311, the bracket protrusion 311 may be located through the upper housing 210.

In this instance, the upper housing 210 may include a rotation hole 211 formed on a path along which the bracket protrusion 311 moves so as not to interfere with movement of the bracket protrusion 311.

The bracket protrusion 311 may not cover all of the rotation hole 211 while moving. To cover, the angle adjustment portion 20 may include a cover portion 230 having a shape corresponding to the rotation hole 211.

That is, the angle adjustment portion 20 may include the cover portion 230 that is coupled to the bracket protrusion 311 and covers the rotation hole 211 to prevent foreign substances from entering an inside of the upper housing 210 through the rotation hole 211.

The cover portion 230 may include a hole 231. The bracket protrusion 311 may be coupled to the electronic device 10 by passing through the hole 231.

The lower housing 220 may include a cylinder guide 222 for coupling the angle adjustment module 30 and a cylinder hole 221 formed therethrough. The lower housing 220 may further include a protrusion hole 223 to allow the angle adjustment module 30 to be coupled to the lower housing 220.

FIG. 4 is a perspective view illustrating a state in which the housing 200 of the angle adjustment portion 20 of FIG. 3 is removed according to one or more embodiments.

As shown in FIG. 4, when the housing 200 and the cover portion 230 are removed from the angle adjustment portion 20, the angle adjustment module 30 appears.

The angle adjustment module 30 may include a base plate 320. The base plate 320 is shown as being in a shape of a plate, without being limited thereto.

A size of the base plate 320 may be limited by an inner size of the housing 200.

The base plate 320 may support the motors. That is, the motors may be located above the base plate 320.

Power transmitted from the motors may move the bracket 310 or the lower housing (FIG. 3, 220). A member for transmitting force may be arranged between the motor and the bracket 310 or the motor and the lower housing 220.

In this instance, the member may be one-way transmission members 400 and 500.

The one-way transmission members 400 and 500 may transmit the power generated by the motor to where power is required, without transmitting an external force to the motor when an external force is present. The external force may be a first external force only acting on the bracket 310 or a second external force only acting on the lower housing 220. The first external force may also be the same force as the second external force. A brake portion may be included to prevent an external force from being transmitted to the motor in a case where the external force is present. A brake may be an electromagnetic brake.

However, a configuration for providing a separate brake portion may cause an increase in material costs. In addition, a configuration for controlling the brake and additional power for control may be required.

Figure 5:
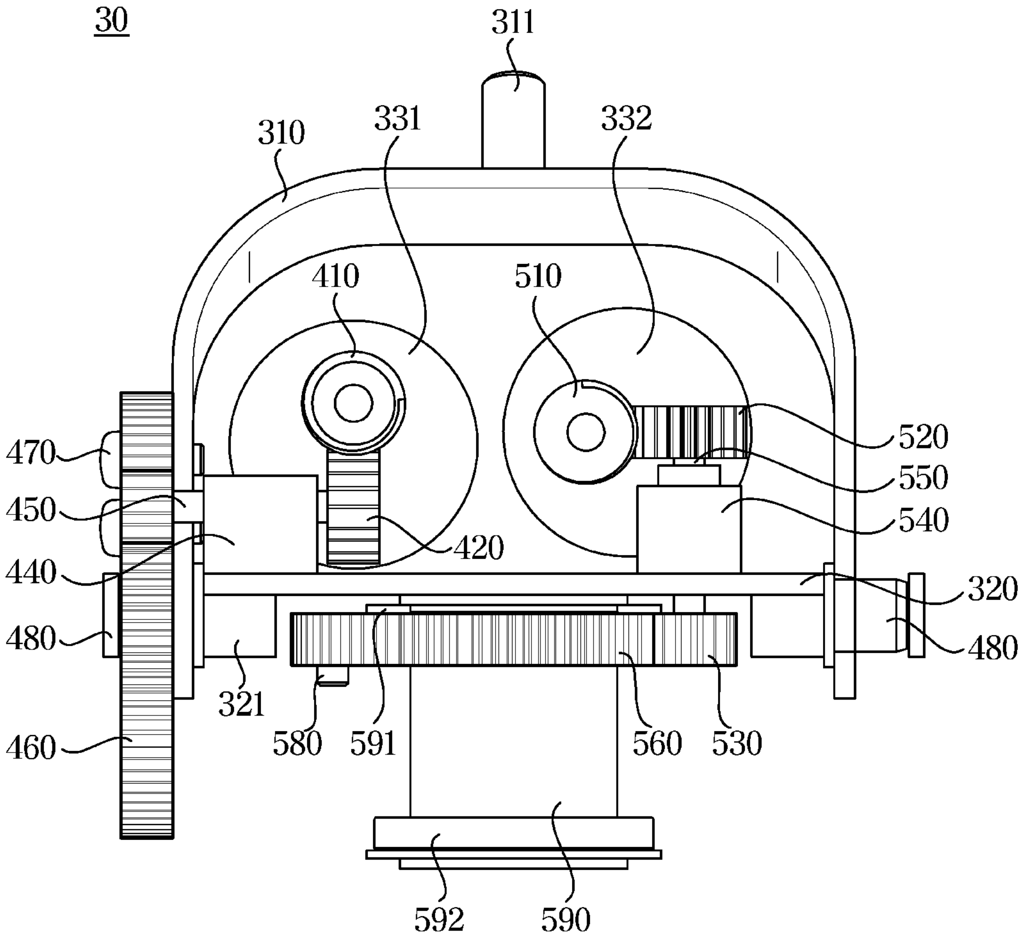
FIG. 5 is a front view of the angle adjustment portion of FIG. 4 according to one or more embodiments.

The one-way transmission members 400 and 500 may include worms 410 and 510 and worm wheels 420 and 520 (see FIG. 5). When the worms 410 and 510 rotate, the worm wheels 420 and 520 rotate, and when the worm wheels 420 and 520 attempt to rotate, the worms 410 and 510 do not rotate.

The worms 410 and 510 may be coupled to rotation shafts of the motors 331 and 332. The worm wheels 420 and 520 may be engaged with the worms 410 and 510. Accordingly, the power of the motors 331 and 332 may be transmitted to the worms 410 and 510 to rotate the worm wheels 420 and 520, but an external force transmitted through the worm wheels 420 and 520 may not rotate the worms 410 and 510. Accordingly, force may be transmitted in one direction.

Rotation axes of the worms 410 and 510 and the worm wheels 420 and 520 may be perpendicular to each other. The rotation axes of the worms 410 and 510 may be in a front and back direction. Accordingly, the rotation axes of the worm wheels 420 and 520 may be a left and right direction.

Because the angle controlling apparatus 1 requires precise angle control, a configuration for deceleration is required. In a case where a configuration for transmitting the power of the motors 331 and 332 is a gear, a gear ratio between the gears may be required to be significantly different. To achieve a large difference in gear ratio through spur gears, gears with a large difference in radius are required to be used. A large gear is required to be used to achieve a large difference in radius. Using a large gear increases an overall size of a product. As the size of the product increases, portability may be limited.

In a case where the configuration for transmitting power is the worms 410 and 510 and the worm wheels 420 and 520, a large reduction ratio may be obtained without using a large gear. Accordingly, a desired reduction ratio may be obtained without increasing a size of a product, and thus small-sized products may be produced, which may lead to increased portability. In particular, in a case where an electronic product is the projector 100 and the entire product is the mini projector 100, portability may be increased.

Power may be transmitted directly from the worm wheels 420 and 520 to the bracket 310. However, in order to reduce a size of the housing 200, positional relationships among internal components of the housing 200 may be changed and the power may be transmitted to the changed position.

The one-way transmission members 400 and 500 may include connection gears 430 and 530 engaged with a bracket gear 460 or a housing gear 560. Rotation axes of the connection gears 430 and 530 and rotation axes of the worm wheels 420 and 520 may be the same. The connection gears 430 and 530 and the worm wheels 420 and 520 may be connected by connection shafts 450 and 550. The connection shafts may serve as rotation axes of the worm wheels 420 and 520 and the connection gears 430 and 530.

Because the connection shafts 450 and 550 extend from the worm wheels 420 and 520 to the connection gears 430 and 530, the connection shafts 450 and 550 require to be supported by another member in order to be positioned at a desired position. To this end, shaft supports 440 and 540 coupled to the base plate 320 may be included.

A large difference in gear ratio between the connection gears 430 and 530 and the bracket gear 460 or between the connection gears 430 and 530 and the housing gear 560 may result in a large reduction ratio. Because the gear ratio difference may be large only when a size difference between the gears is large, the larger the size difference between the connection gears 430 and 530 and the bracket gear 460 or between the connection gears 430 and 530 and the housing gear 560, the larger the reduction ratio.

That is, the connection gears 430 and 530 may be required to be smaller than the bracket gear 460 or the housing gear 560 to help decelerate the bracket gear 460 or the housing gear 560. The smaller the connection gears 430 and 530, the more the bracket gear 460 or housing gear 560 may be decelerated. Through the above, a gear having the same number of rotations as the gears of the worm wheels 420 and 520, but with a smaller radius, may be engaged with the bracket gear 460 or the housing gear 560.

In order to emit an output of the electronic device 10 at a desired angle, the electronic device 10 may be required to be adjusted in the up and down and left and right angles. Adjusting an angle in the up and down direction may be referred to as tilting T. Adjusting an angle in the left and right directions may be referred to as panning P.

Power may be required for each tilting T and panning P. In this instance, the motor for tilting T may be referred to as the first motor 331. The motor for panning P may be referred to as the second motor 332.

The one-way transmission member provided for tilting T may be referred to as the first one-way transmission member 400. The one-way transmission member provided for panning P may be referred to as the second one-way transmission member 500. Each configuration thereof is described with reference to FIG. 5.

FIG. 5 is a front view of the angle adjustment portion 20 of FIG. 4 according to one or more embodiments.

The bracket 310 may be rotatably coupled to the base plate 320. The bracket 310 may be coupled to both sides of the base plate 320 by bracket support 480. The bracket support 480 may pass through and couple the base plate 320 and the bracket 310, and may prevent the bracket 310 from being separated from the base plate 320.

The bracket 310 may be extended from one side coupled to the base plate 320, bent and extended to the other side of the base plate 320, and bent again toward the other side coupled to the base plate 320.

Due to the above shape, a space may be created between the bracket 310 and the base plate 320.

The motors 331 and 332 may be located between the bracket 310 and the base plate 320. Specifically, the motors 331 and 332 may be located above the base plate 320, and thus the base plate 320 may support the motors 331 and 332.

The angle adjustment module 30 may include the first one-way transmission member 400 that transmits power for tilting T and the second one-way transmission member 500 that transmits power for panning P.

Hereinafter, the first one-way transmission member 400 for tilting T and the second one-way transmission member 500 for panning P are described separately.

Figure 6:
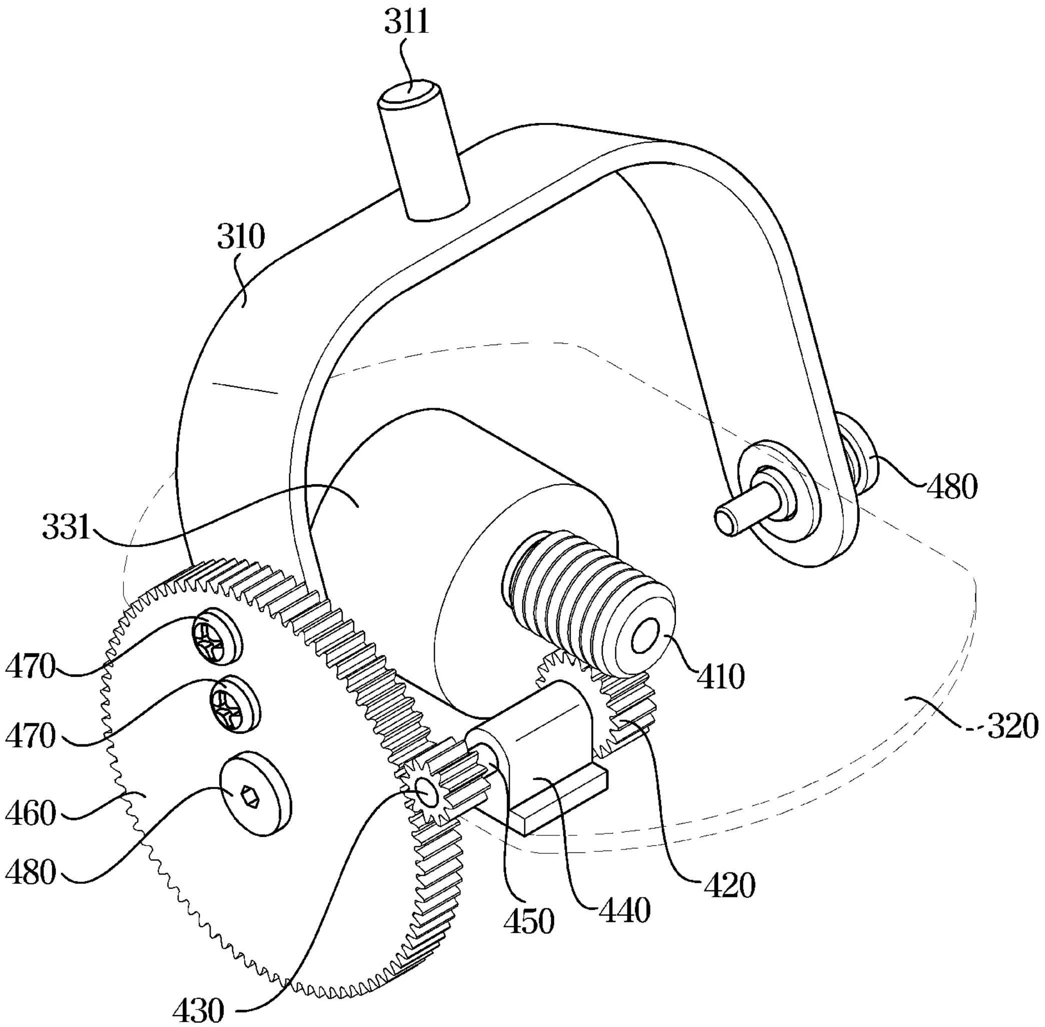
FIG. 6 is a perspective view of a first one-way transmission member in the angle adjustment portion of FIG. 3 according to one or more embodiments.

FIG. 6 is a perspective view of the first one-way transmission member in the angle adjustment portion 20 of FIG.

Figure 7:
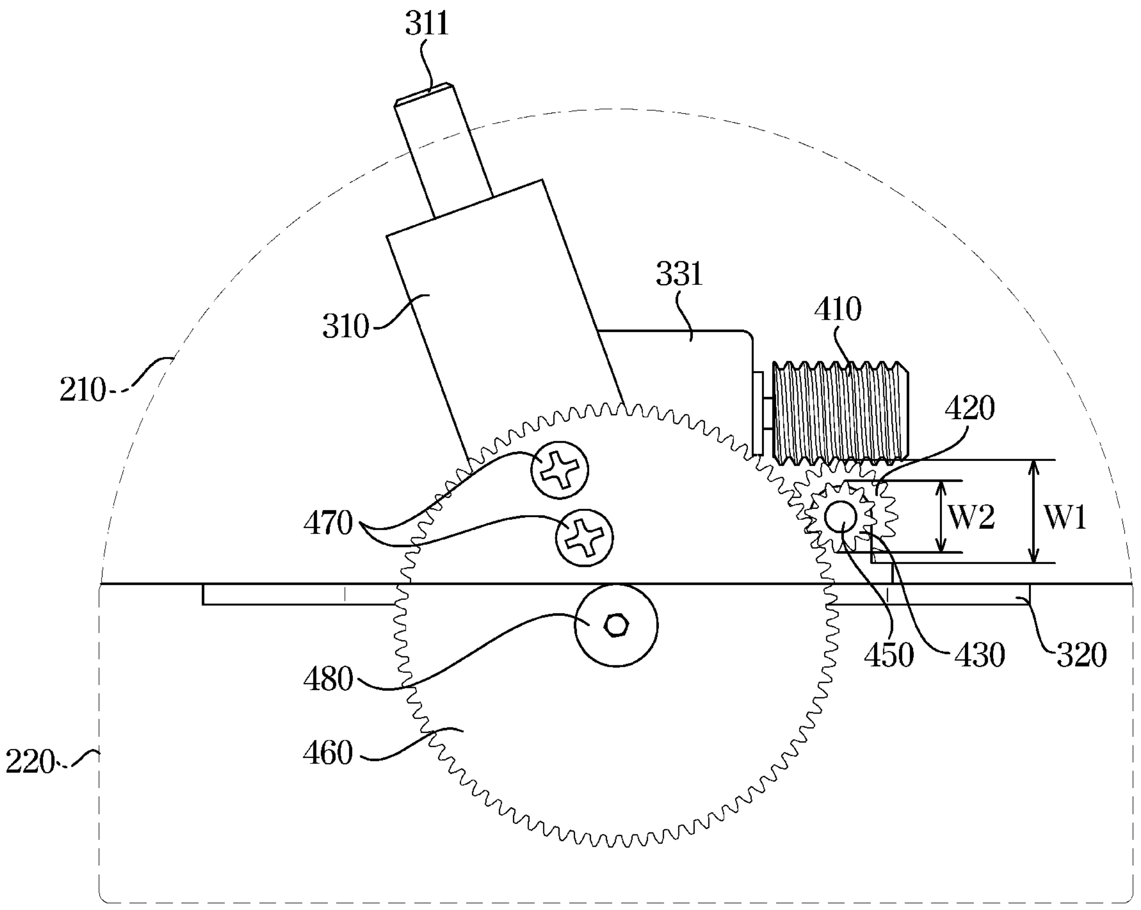
FIG. 7 is a side view of the angle adjustment portion of FIG. 6 according to one or more embodiments.

3 according to one or more embodiments. FIG. 7 is a side view of the angle adjustment portion 20 of FIG. 6 according to one or more embodiments.

As shown in FIG. 6 and FIG. 7, the first one-way transmission member 400 transmits power to the bracket 310 to cause the bracket 310 to rotate up and down, thereby allowing the electronic device 10 coupled to the bracket 310 to rotate up and down.

The first one-way transmission member 400 may include the first motor 331.

The rotation shaft of the first motor 331 may be located in a front and back direction of the angle controlling apparatus 1. The first worm 410 may be coupled to the rotation shaft of the first motor 331. The first worm wheel 420 may be engaged with the first worm 410. The rotation axis of the first worm wheel 420 and the rotation shaft of the first motor 331 may be positioned vertically. The rotation axis of the first worm wheel 420 may be positioned in the left and right directions toward the bracket gear 460 in order to transmit power to the bracket gear 460. Accordingly, the rotation shaft of the first motor 331 may not require to be horizontal to a rotation axis of the bracket gear 460.

The base plate 320 located inside the housing 110 may be further included. The bracket 310 may be rotatably coupled to the base plate 320. The first motor 331 may be located between the base plate 320 and the bracket 310, and the bracket gear 460 may be coupled to be adjacent to an outer surface of the bracket 310.

The first connection gear 430 may have the same rotation axis as the first worm wheel 420. The first connection gear 430 may be engaged with the bracket gear 460 coupled to the bracket 310. The first worm wheel 420 and the bracket gear 460 may be engaged. In this case, power may be transmitted without the first connection gear 430. However, in a case where the first connection gear 430 does not exist, the first motor 331 requires to be positioned to engage the bracket gear 460 and the first worm wheel 420, and thus a size of the housing 200 in which the first motor 331 is located may be increased.

The first worm wheel 420 may be coupled to the first connection gear 430 by the first connection shaft 450. The first connection shaft 450 may be located on the rotation axes of the first worm wheel 420 and the first connection gear 430. The first connection shaft 450 may extend from a rotation center of the first worm wheel 420 to a rotation center of the first connection gear 430.

The bracket gear 460 may be located outside the bracket 310. Because the bracket 310 may be rotatably coupled to both sides of the base plate 320, the bracket 310 may be coupled to the outside of the base plate 320. Accordingly, the bracket gear 460 may be coupled to the outside of the base plate 320. Accordingly, the first connection gear 430 that may be engaged with the bracket gear 460 may be located outside the base plate 320. The first connection shaft 450 extending from the rotation center of the first worm wheel 420 to the rotation center of the first connection gear 430 may extend from the inside of the base plate 320 to the outside of the base plate 320.

Figure 8:
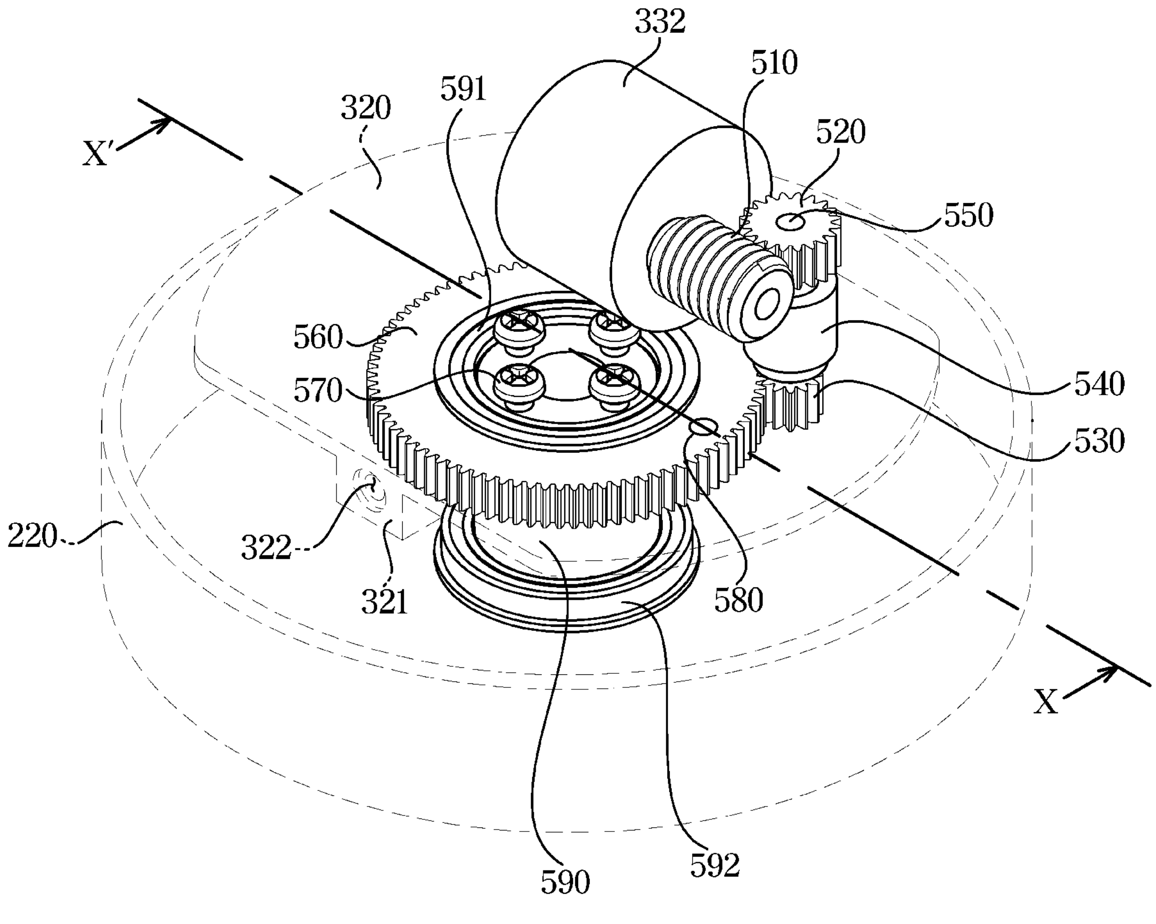
FIG. 8 is a perspective view illustrating a second one-way transmission member in the angle adjustment portion of FIG. 3 according to one or more embodiments.

The rotation axis of the bracket gear 460, the bracket 310, and the base plate 320 may be coupled to each other by the bracket support 480 to allow the bracket 310 and the bracket gear 460 to rotate. A hole may be provided in the bracket 310, and a support protrusion (FIG. 8, 321) of the base plate 320 may include a support hole (FIG. 8, 322). The bracket support 480 may pass through the hole of the bracket 310 and the support hole of the base plate 320 (FIG. 8, 322) to couple the bracket 310, the bracket gear 460, and the base plate 320.

As the bracket gear 460 moves, the bracket 310 moves, thereby adjusting an angle of the electronic device 10 coupled thereto. To this end, the bracket gear 460 may be coupled to the bracket 310. The bracket 310 and the bracket gear 460 may be coupled by a bracket screw 470. Two bracket screws 470 may be provided. The bracket screws 470 may be aligned and coupled in the vertical direction. As a result, the bracket 310 and the bracket gear 460 may be stably coupled.

The first connection shaft 450 may be supported by the first shaft support 440 located on an upper side of the base plate 320. The first shaft support 440 may have a cylindrical shape with a hole formed in the center.

The bracket gear 460 may be engaged with the first connection gear 430. Because a large reduction ratio is achieved when the gear ratio difference between the bracket gear 460 and the first connection gear 430 is significantly large, a large size difference between the bracket gear 460 and the first connection gear 430 may be preferable for increasing the reduction ratio. As the reduction ratio of the bracket gear 460 increases, more precise control may be achieved.

To this end, preferably, an outer circumference of the bracket gear 460 is arranged adjacent to an inner surface of the housing 200.

The upper housing 210 requires the rotation hole 211 corresponding to an angle at which the electronic device 10 moves, and thus in order to increase portability by reducing a size of the housing 200, the lower housing 220 may be formed smaller than the upper housing 210. In this case, the bracket gear 460 may be arranged adjacent to the inner surface of the lower housing 220.

In order for the angle controlling apparatus 1 to stand stably, a lower surface of the housing 200 requires to be formed to have a predetermined width, and thus a width of the lower housing 220 may be greater than a height. Accordingly, the bracket gear 460 may be provided adjacent to the lower inner surface of the lower housing 220.

The upper housing 210 may be provided adjacent to the outer surface of the bracket 310, and the lower housing 220 may be provided adjacent to the outer circumference of the bracket gear 460.

The first worm 410 may be moved by the power generated from the first motor 331, and the first worm wheel 420 engaged with the first worm 410 may be moved by the first worm 410. The first worm wheel 420 may move the first connection gear 430 sharing a rotation axis, and the first connection gear 430 may move the bracket gear 460 engaged therewith. The bracket gear 460 may move the bracket 310 coupled thereto. Because the electronic device 10 is coupled to the bracket 310, the electronic device 10 may move up and down by the movement of the bracket 310.

Figure 9:
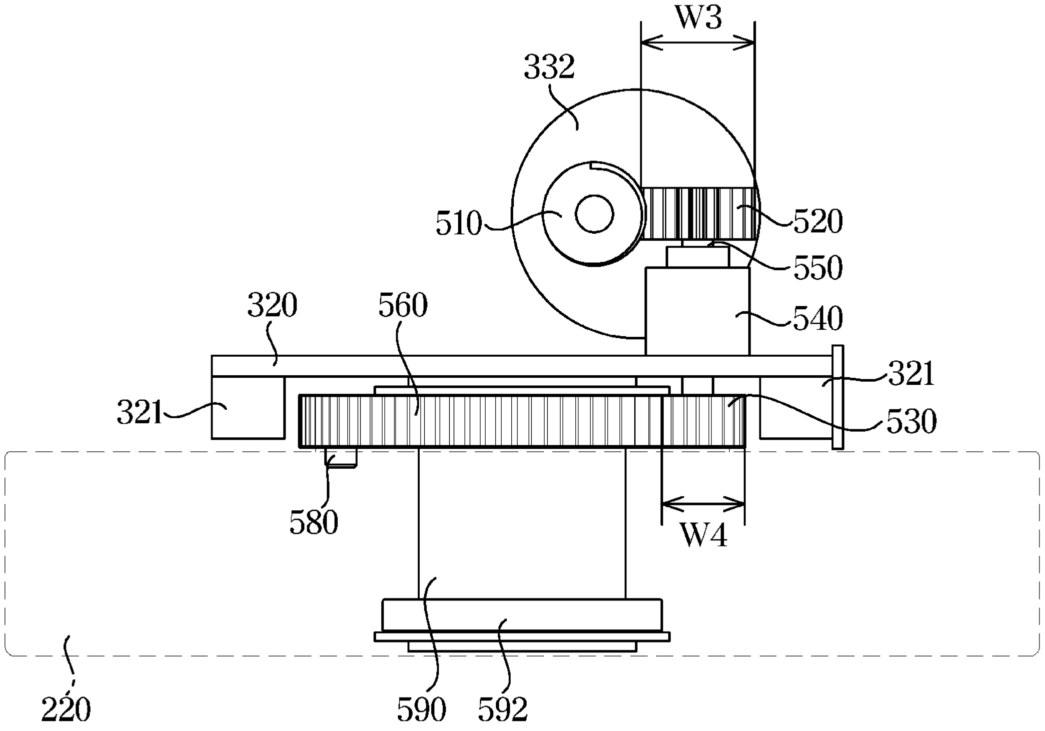
FIG. 9 is a front view of the angle adjustment portion of FIG. 8 according to one or more embodiments.
Figure 10:
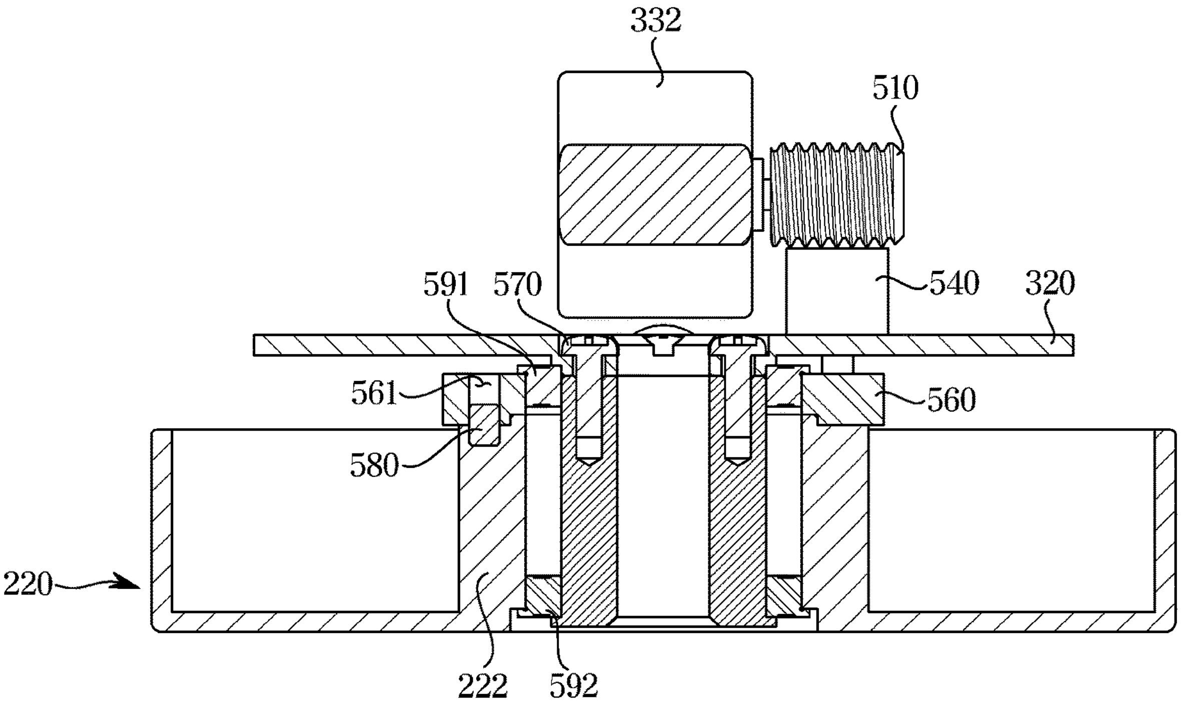
FIG. 10 is a cross-sectional view illustrating the angle adjustment portion of FIG. 8 taken along line XX' according to one or more embodiments.

FIG. 8 is a perspective view illustrating the second one-way transmission member 500 in the angle adjustment portion 20 of FIG. 3 according to one or more embodiments. FIG. 9 is a front view of the angle adjustment portion 20 of FIG. 8. FIG. 10 is a cross-sectional view illustrating the angle adjustment portion 20 of FIG. 8 taken along line XX' according to one or more embodiments.

As shown in FIG. 8 to FIG. 10, the second one-way transmission member 500 may include the second motor 332.

The rotation shaft of the second motor 332 may be located in the front and back direction of the angle controlling apparatus 1. The rotation shaft of the second motor 332 may be located parallel to the rotation shaft of the first motor 331. The second worm 510 may be coupled to the rotation shaft of the second motor 332. The first worm wheel 420 may be engaged with the second worm 510. The rotation axis of the first worm wheel 420 and the rotation shaft of the second motor 332 may be positioned vertically. The rotation axis of the first worm wheel 420 may be positioned in a vertical direction toward the housing gear 560 in order to transmit power to the housing gear 560. Accordingly, the rotation shaft of the second motor 332 may not require to be horizontal to a rotation axis of the housing gear 560.

The second connection gear 530 may have the same rotation axis as the first worm wheel 420. The second connection gear 530 may be engaged with the housing gear 560 coupled to the lower housing 220. The first worm wheel 420 and the housing gear 560 may be engaged. In this case, power may be transmitted without the second connection gear 530. However, in a case where the second connection gear 530 does not exist, the second motor 332 may be required to be positioned to engage the housing gear 560 and the first worm wheel 420, and thus a size of the housing 200 in which the second motor 332 is located may be increased.

The first worm wheel 420 may be coupled to the second connection gear 530 by the second connection shaft 550. The second connection shaft 550 may be located on the rotation axes of the first worm wheel 420 and the second connection gear 530. The second connection shaft 550 may extend from a rotation center of the first worm wheel 420 to a rotation center of the second connection gear 530.

The second connection shaft 550 may be supported by the second shaft support 540 located on an upper side of the base plate 320. The second shaft support 540 may have a cylindrical shape with a hole formed in the center.

Because the base plate 320 may support the second motor 332, the second motor 332, the second worm 510, and the first worm wheel 420 may be arranged on the upper side of the base plate 320. Because the housing gear 560 may be located below the base plate 320, the second connection gear 530 engaged therewith may be located below the base plate 320. Accordingly, the second connection shaft 550 connecting the second connection gear 530 and the first worm wheel 420 may be formed through the base plate 320.

The housing gear 560 may be formed adjacent to the base plate 320. The housing gear 560 may be formed below the base plate 320. A through hole may be formed in a center of the rotation axis of the housing gear 560. A support cylinder 590 may be formed through the through hole formed at the center of the rotation axis of the housing gear 560. The support cylinder 590 may serve as the rotation axis of the housing gear 560. The support cylinder 590 may have a cylindrical shape. The support cylinder 590 and the housing gear 560 may be coupled through the first bearing 591. Friction during relative movement between the support cylinder 590 and the housing gear 560 may be reduced through the first bearing 591.

The support cylinder 590 may be located adjacent to the base plate 320 below the base plate 320. The base plate 320 and the support cylinder 590 may be coupled. The base plate 320 and the support cylinder 590 may be coupled by a housing screw 570. The housing screw 570 may pass through a center side of the base plate 320 and an upper surface of the support cylinder 590 to couple the base plate 320 and the support cylinder 590.

The housing gear 560 may include a coupling hole 561 (see FIG. 10) passing through one side of the gear. A coupling protrusion 580 having a cross-section corresponding to a cross-section of the coupling hole 561 may be located through the coupling hole 561. The coupling protrusion 580 may be located through the protrusion hole (FIG. 3, 223) located in the lower housing 220. Accordingly, the housing gear 560 and the lower housing 220 may be coupled to each other by the coupling protrusion 580. However, a method in which the housing gear 560 and the lower housing 220 are coupled is not limited thereto. According to one or more embodiments, the housing gear 560 and the lower housing 220 may be coupled to each other using a coupling member such as adhesive or screw.

The cylinder hole 221 may be provided on the rotation axis of the lower housing 220. In an inner circumference of the cylinder hole 221, the cylinder guide 222 protruding toward the upper housing 210 and extending in a circumferential direction of the cylinder hole 221 may be provided. The protrusion hole 223 passing through the cylinder guide 222 may be provided on one side of the cylinder guide 222. The coupling protrusion 580 may be coupled to the protrusion hole 223 located as described above.

Because the housing gear 560 and the lower housing 220 are coupled, rotation of the housing gear 560 may cause rotation of the lower housing 220. Because the lower housing 220 is separated from other components, rotation of the lower housing 220 may be viewed as relative rotation of other components. When the lower housing 220 is fixed to a floor, the upper housing 210, which is separate from the lower housing 220, may be seen as rotating. It may be viewed as the rotation of the electronic device 10 separated from the lower housing 220. Accordingly, the panning P of the electronic device 10 may be adjusted.

The support cylinder 590 may extend from the housing gear 560 to the lower housing 220. Specifically, the support cylinder 590 may pass through a through hole formed at a position corresponding to the rotation axis of the housing gear 560 and may be received in the cylinder hole 221 of the lower housing 220. A second bearing 592 may be arranged between the cylinder hole 221 of the lower housing 220 and the support cylinder 590. The second bearing 592 may reduce friction therebetween when the lower housing 220 rotates relative to the support cylinder 590.

Further included are the support cylinder 590 that has the same rotation axis as the lower housing 220 and is coupled to the base plate 320, the first bearing 591 located between an outside of the support cylinder 590 and the housing gear 560, and the second bearing 592 that is spaced apart from the first bearing 591 and is located between the outside of the support cylinder 590 and the lower housing 220.

The housing gear 560 may be engaged with the second connection gear 530. Because a large reduction ratio is achieved when a gear ratio difference between the housing gear 560 and the second connection gear 530 is significantly large, a large size difference between the housing gear 560 and the second connection gear 530 may be preferable for increasing the reduction ratio.

To this end, an outer circumference of the housing gear 560 may be provided adjacent to the support protrusion 321.

The support protrusion 321 may be located on one side of the base plate 320 and may protrude downward, and thus providing the size of the housing gear 560 as described above may be for increasing the size of the housing gear 560.

The second worm 510 may be moved by the power generated from the second motor 332, and the second worm wheel 520 engaged with the second worm 510 may be moved by the second worm 510. The second worm wheel 520 may move the second connection gear 530 sharing a rotation axis, and the second connection gear 530 may move the housing gear 560 engaged therewith. The housing gear 560 may move the lower housing 220 coupled thereto. Because the lower housing 220 may be fixed to a floor, the electronic device 10 may relatively move left and right.

The one-way transmission members 400 and 500 described above is applicable to the portable projector 100. That is, the electronic device 10 may be the projector 100, but is not limited thereto.

The projector 100 is currently becoming miniaturized, and with the development of technology, even miniaturized projectors 100 may produce images with image quality above a certain level.

By combining the projector 100 and a fully automatic motion function and applying a remote control system to the projector 100, the projector 100 may be improved, and new scenarios and utilization functions may be discovered in connection with various applications. Thus, scalability may be increased.

Even in the case of the projector 100 equipped with a fully automatic motion function, maintaining a desired angle is critical because the projector 100 is to provide a stable screen environment without shaking while viewing an image.

In particular, in the case of a highly portable projector 100, a battery within the projector 100 may be used. In this case, a high power consumption of system may reduce a usage time of the projector 100, and thus minimizing power consumption is required. In this regard, the one-way transmission members 400 and 500 are preferably applied to the portable projector 100.

Hereinafter, a control-related configuration is described.

Figure 11:
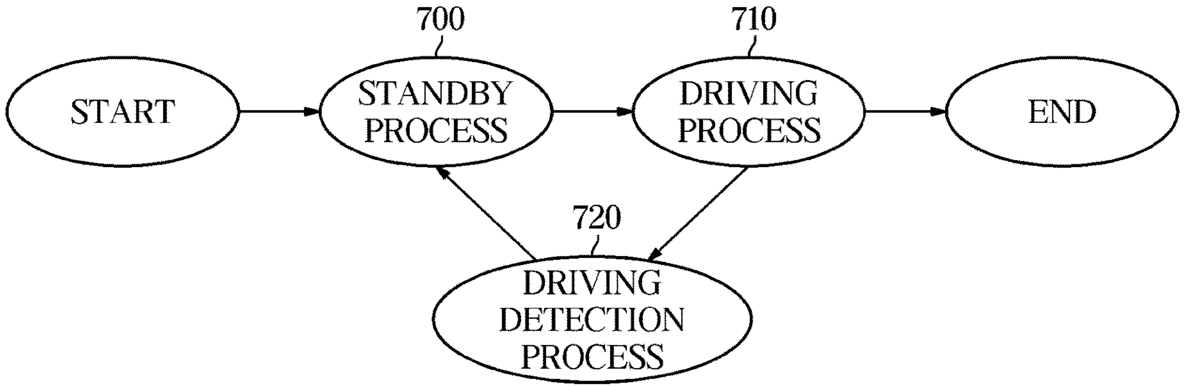
FIG. 11 is a conceptual diagram illustrating a control order of the angle controlling apparatus of FIG. 1 according to one or more embodiments.

FIG. 11 is a conceptual diagram illustrating a control order of the angle controlling apparatus 1 of FIG. 1 according to one or more embodiments.

Figure 13:
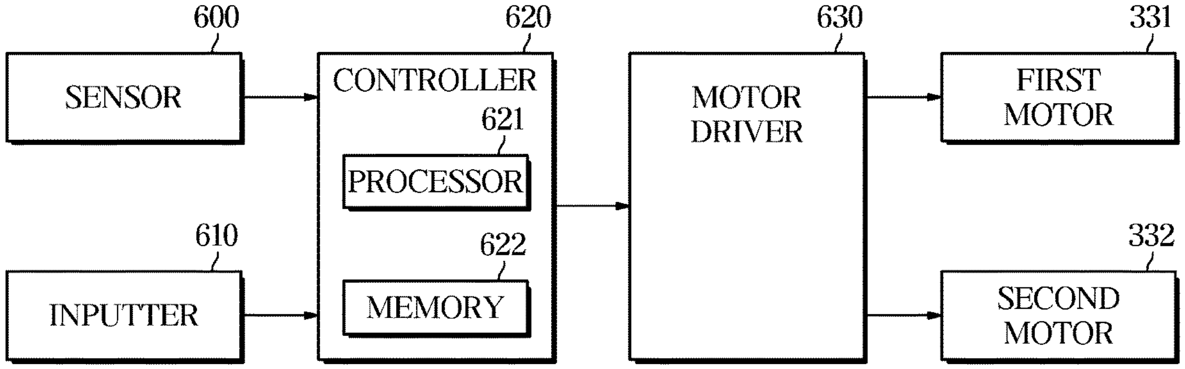
FIG. 13 is a control block diagram illustrating the control method of FIG. 11 according to one or more embodiments.

As shown in FIG. 11, the angle controlling apparatus 1 may perform a driving process 710 by the inputter 610 (FIG. 13, 610). An angle may be changed to a desired position by the driving process 710. In the driving process 710, power generated by the motors 331 and 332 described above is transmitted to the electronic device 10 to perform tilting T and panning P, thereby moving the electronic device 10 to a desired angle.

Thereafter, the angle controlling apparatus 1 may perform a driving detection process 720 by the sensor 600 (FIG. 13, 600). The driving detection process 720 is a process for determining whether the electronic device 10 has moved to the desired angle. Based on a determination that the electronic device 10 has moved to the desired angle in the driving detection process 720, the angle controlling apparatus 1 may be switched to a standby process 700.

The standby process 700 is a process in which no power is consumed for angle control. In a case of an apparatus for adjusting an angle of the electronic device 10, the weight of the electronic device 10 may cause the electronic device 10 to move at an adjusted angle. In order to correct the movement, the angle controlling apparatus 1 may include a controller 620 (see FIG. 13) for correcting an angle. In a case where the controller 620 that corrects an angle is included, an angle control of the electronic device 10 requires to be performed frequently using the motors 331 and 332, which consumes power. In addition, if left unattended, back electromotive force may be generated, which may damage hardware without a protection circuit. In a case where such power consumption is continued in the motors 331 and 332, a portion of the power that requires to be used for the angle controlling apparatus 1 may continue to be consumed in the motors 331 and 332. In this instance, in a case where the angle controlling apparatus 1 is portable and does not receive power through a cable, but is supplied with power including a pre-charged battery, the power of the battery is continuously used to control the motors 331 and 332, and thus a usable time of the angle controlling apparatus 1 is shortened. Furthermore, because the motors 331 and 332 are continuously controlled, the service life of the motors 331 and 332 themselves may be shortened.

However, in a case where the motors 331 and 332 are unable to move due to a self-weight of the electronic device 10 or an external force, even when the above-described controller 620 is not included, or even without continuously supplied power, a desired angle of the angle controlling apparatus 1 may be maintained by the one-way transmission members 400 and 500.

In this case, the power used in the motors 331 and 332 may be reduced, and thus the usable time of the angle controlling apparatus 1 may be increased. In addition, the service life of the motors 331 and 332 may be increased.

Figure 12:
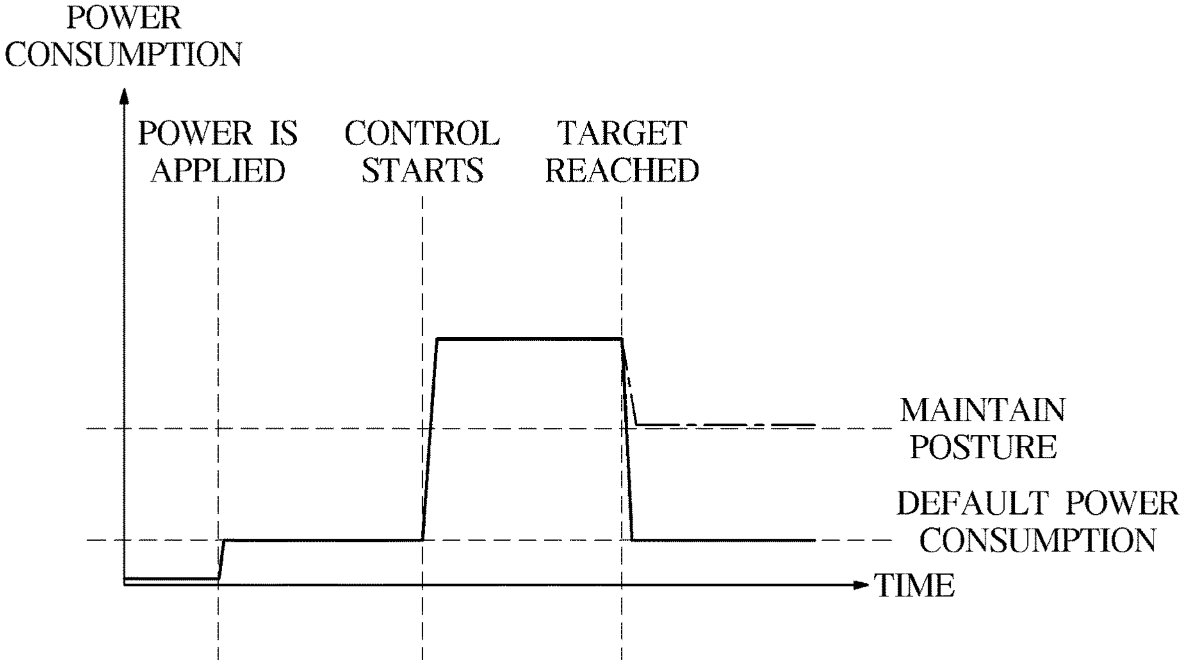
FIG. 12 is a graph illustrating power consumption according to the control order of FIG. 11 according to one or more embodiments.

FIG. 12 is a graph illustrating power consumption according to the control order of FIG. 11 according to one or more embodiments.

As shown in FIG. 12, no power is consumed before power is applied. When "power is applied", default power consumption occurs. The default power consumption may be the power continuously required when the angle controlling apparatus 1 communicates with an external server or transmits information.

When the angle adjustment module 30 of the angle controlling apparatus 1 starts to change an angle of the electronic device 10, "control starts". When control starts, power is consumed by the motors 331 and 332, and thus a power consumption value increases. When a predetermined amount of power is consumed, the electronic device 10 reaches a desired angle. A time at which the desired angle is reached is displayed on a graph as "target reached".

After reaching the target, according to the disclosure, no additional power may be consumed to control the motors 331 and 332, which is represented as a solid line in the graph shown. However, in a case where the one-way transmission member of the disclosure does not exist, the motors 331 and 332 require to be driven to maintain a posture, and thus power may be consumed, which is represented as a dash line in the graph.

FIG. 13 is a control block diagram illustrating the control method of FIG. 11 according to one or more embodiments.

As shown in FIG. 13, the controller 620 controlling the above-described operations may include the memory 622 storing a program for performing the operations and the processor 621 executing the stored program.

For example, the controller 620 may perform a pre-stored action based on a signal transmitted by the inputter 610. The controller 620 may operate the first motor 331 and the second motor 332 through the motor driver 630, thereby changing an angle of the angle controlling apparatus 1 to a pre-stored position.

After the operation is completed, the driving detection process 720 may be performed by the sensor 600. In a case where it is confirmed that the angle of the angle controlling apparatus 1 is not moved as desired based on information input by the sensor 600, the controller 620 may operate the first motor 331 and the second motor 332 through the motor driver 630, thereby changing the angle of the angle controlling apparatus 1 back to the desired position.

Figure 14:
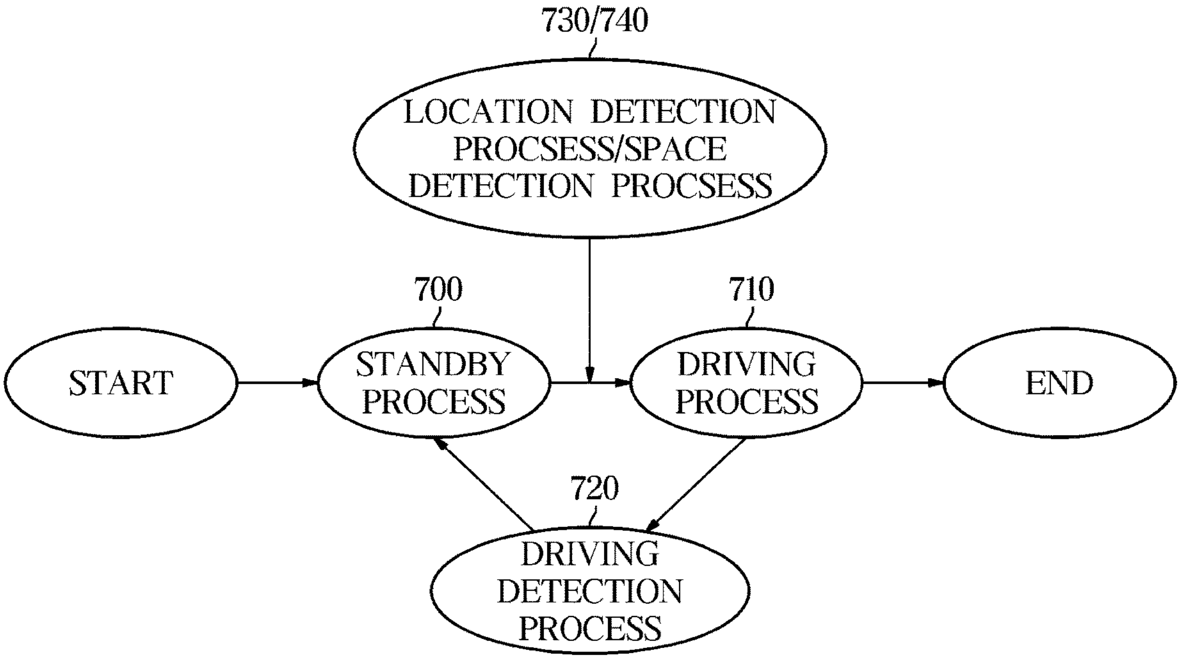
FIG. 14 is a conceptual diagram illustrating that a location detection process and a space detection process are further performed to FIG. 11 according to one or more embodiments.

FIG. 14 is a conceptual diagram illustrating that a location detection process 730 and a space detection process 740 are further performed to FIG. 11 according to none or more embodiments.

In general, input may be transmitted to the controller 620 (FIG. 13, 620) through the inputter 610, and the controller 620 may perform a stored action based on the transmitted information.

In a case where the electronic device 10 is the projector 100 and the angle controlling apparatus 1 is portable, the angle controlling apparatus 1 may perform various functions using information received through the sensor 600. For convenience of description, the following description is made with an assumption that the electronic device 10 is the projector 100.

Because the projector 100 may be portable, the projector 100 may be used while moving from space to space. Because of such characteristics, a position where an image is projected may vary each time, thereby projecting an image optimized for each position. Alternatively, an optimized image may be projected by recognizing a space to be used. The space detection process 740 for detecting a space or the location detection process 730 for detecting a position may be further performed.

The memory 622 may store the location detection process 730 for detecting a position to emit a beam and adjusting a size or emission position of the projection image emitted from the projector 100. Accordingly, when the position where the beam is to be emitted is recognized through the sensor 600, the controller 620 may control an angle of the projector 100 to adjust the size or position of the projection image in order for the projection image to be clearly seen.

For example, the size of the projection image may be adjusted to fit a size of an entire wall on which the image is to be projected. Alternatively, the angle may be adjusted to correct the projection image by recognizing a tilted screen and correcting the tilt.

In addition, the memory 622, in a case where the angle controlling apparatus 1 is located in a certain space and the electronic device 10 is the projector 100, may store an action for emitting a beam to a preset position. Accordingly, when the angle controlling apparatus 1 is located in the set space, the controller 620 may operate the first motor 331 and the second motor 332 through the motor driver 630 to emit a beam to the preset position, which causes rotation of the bracket 310 and the lower housing 220.

For example, in a case where the angle controlling apparatus 1 is placed in a bedroom for sleeping, an image for sleeping may be projected. Alternatively, in a case where the angle controlling apparatus 1 is placed in a living room, an image related to a daily schedule may be projected.

In a case where a usable location is free, a variety of functions detecting and interacting with a movement of people or objects may be performed.

Figure 15:
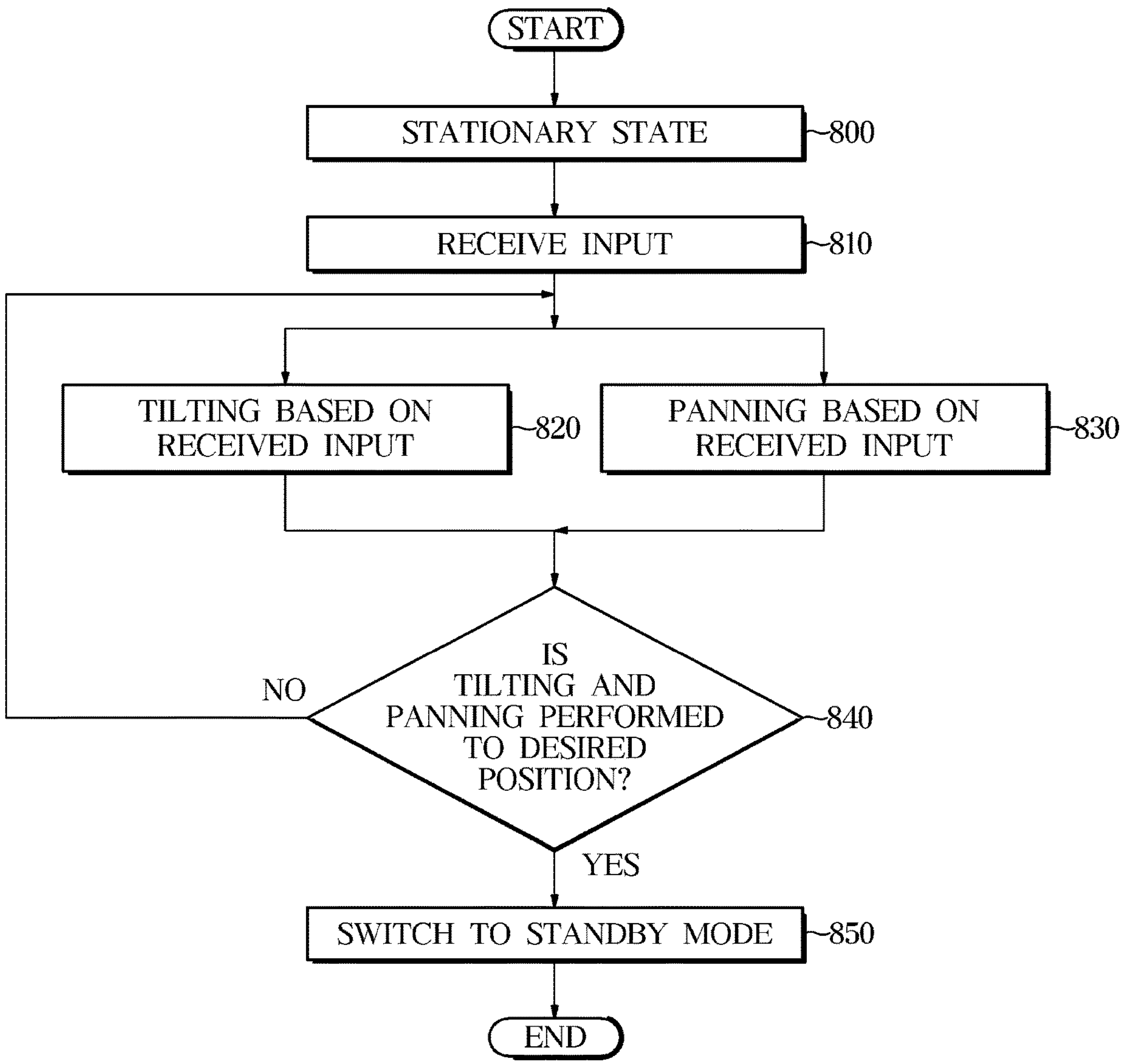
FIG. 15 is a flowchart illustrating a control order of the angle controlling apparatus of FIG. 11 according to one or more embodiments.

FIG. 15 is a flowchart illustrating a control order of the angle controlling apparatus 1 of FIG. 11 according to one or more embodiments.

As shown in FIG. 15, an angle controlling method of the angle controlling apparatus 1 may include receiving an input (810) in a stationary state (800). Here, the received input may be an input received through the inputter (FIG. 13, 610) or an input received through the sensor (FIG. 13, 600).

The angle controlling method of an electronic device may include tilting T through the motors 331 and 332 based on the received input (830) and panning P through the motors 331 and 332 based on the received input (820). As described above, power generated by the motors 331 and 332 may be transmitted to the bracket 310 or the lower housing 220, causing an angle to be adjusted to a desired position.

The angle controlling method of an electronic device may include determining whether the tilting T and the panning P have been performed to the input position (840). The sensor (FIG. 13, 600) may determine whether the tilting T and the panning P have been performed to the input position.

When the tilting T and the panning P have been performed to the input position, the angle controlling method of an electronic device may include switching to a standby mode (850) performed by using a one-way transmission member for preventing the motors 331 and 332 from moving by an external force without additionally consumed power in the motors 331 and 332.

When the tilting T and the panning P have not been performed to the input position, the angle controlling method may include tilting T through the motors 331 and 332 based on the received input 830 and panning P through the motors 331 and 332 based on the received input 820 until the tilting T and panning P are performed to the desired position. When the tilting T and the panning P have been performed to the input position, the angle controlling method of an electronic device may include switching to a standby mode 850 performed by using a one-way transmission member for preventing the motors 331 and 332 from moving by an external force without additionally consumed power in the motors 331 and 332.

In a case where the angle controlling apparatus 1 does not include the one-way transmission members 400 and 500, adjustment may be performed continuously by the controller without the standby mode. However, after the desired angle is set, the angle may be maintained by the one-way transmission members 400 and 500 without separate control, and thus the angle controlling method of an electronic device may include the standby mode.

Figure 16:
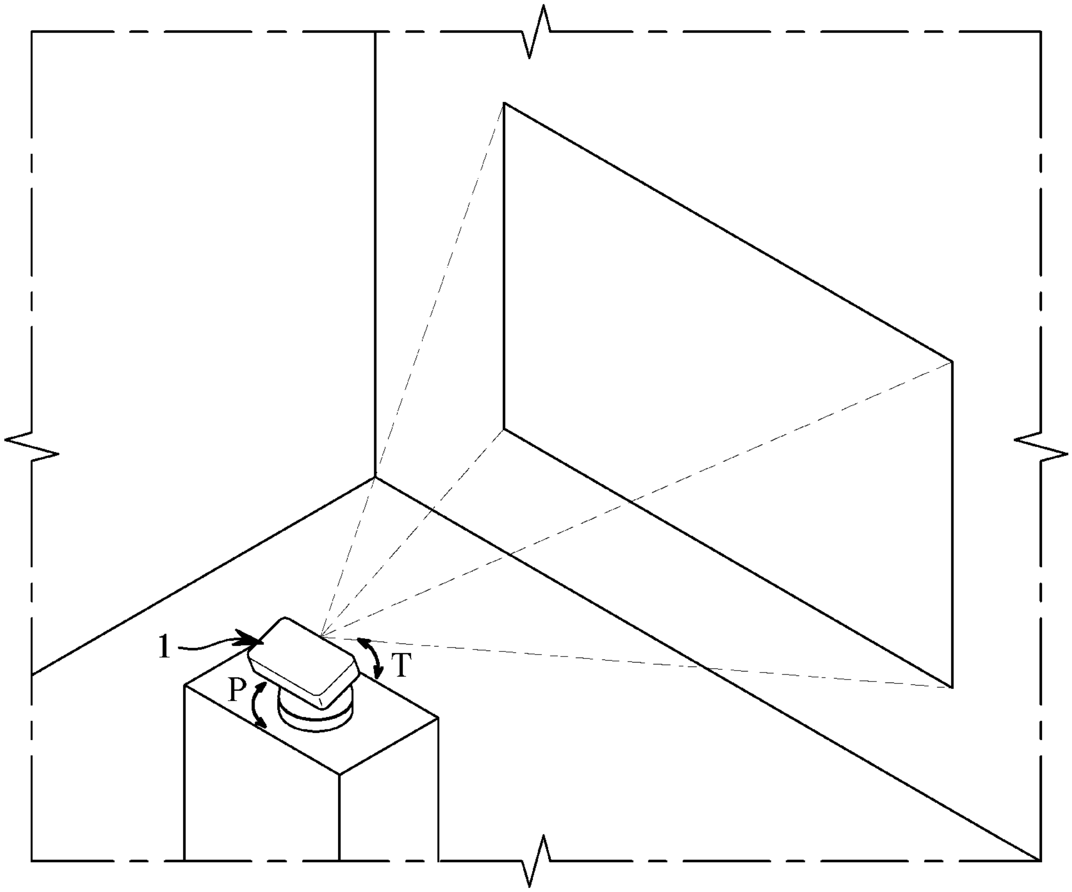
FIG. 16 is a conceptual diagram illustrating driving of the angle controlling apparatus of FIG. 11 according to one or more embodiments.

FIG. 16 is a conceptual diagram illustrating driving of the angle controlling apparatus 1 of FIG. 11 according to one or more embodiments.

By the above-described method, the angle controlling apparatus 1 may project a projection image to a desired position by tilting T and panning P as shown in FIG. 16.

Although certain example embodiments are illustrated and described above, the present disclosure is not limited to these example embodiments, various applications may of course be performed by those skilled in the art without deviating from what is claimed in the scope of claims, and such applications should not be understood separately from the technical idea or prospects herein.

What is claims is:

1. An angle controlling apparatus comprising:

a housing comprising an upper housing and a lower housing;

a bracket inside the housing and configured to be coupled to an electronic device;

a first motor inside the housing and configured to generate power for rotating the bracket in a vertical direction;

a first one-way transmission member comprising at least one first gear and connecting the bracket and the first motor, the first one-way transmission member being configured to:

transmit the power for rotating the bracket in the vertical direction from the first motor to the bracket, and in a state in which a first force is acting on the bracket, prevent the first force from being transmitted to the first motor;

a second motor inside the housing and configured to generate power for rotating the lower housing in left and right directions; and a second one-way transmission member comprising at least one second gear and connecting the lower housing and the second motor, the second one-way transmission member being configured to:

transmit the power for rotating the lower housing in the left and right directions generated by the second motor to the lower housing, and in a state in which a second force is acting on the lower housing, prevent the second force from being transmitted to the second motor.

2. The angle controlling apparatus of claim 1, wherein the first motor comprises a rotation shaft, wherein the first one-way transmission member further comprises a first worm coupled to the rotation shaft of the first motor, wherein the at least one first gear comprises a first worm wheel engaged with the first worm.

3. The angle controlling apparatus of claim 2, wherein the first one-way transmission member further comprises a bracket gear coupled to the bracket and configured to transmit power transmitted from the first worm wheel to the bracket.

4. The angle controlling apparatus of claim 3, wherein an outer circumferential surface of the bracket gear is adjacent to an inner surface of the housing.

5. The angle controlling apparatus of claim 3, further comprising a first connection gear engaged with the bracket gear, wherein the first worm wheel and the first connection gear have a same rotation axis.

6. The angle controlling apparatus of claim 5, wherein a radius of the first connection gear is smaller than a radius of the bracket gear.

7. The angle controlling apparatus of claim 5, wherein the first worm has a rotation axis in a forward and backward direction, and wherein the first worm wheel has a rotation axis in a left and right direction.

8. The angle controlling apparatus of claim 5, further comprising:

a base plate inside the housing, wherein the bracket is rotatably coupled to the base plate, wherein the first motor is between the base plate and the bracket, and wherein the bracket gear is adjacent to an outer surface of the bracket.

9. The angle controlling apparatus of claim 8, wherein the upper housing is adjacent to the outer surface of the bracket, and wherein the lower housing is adjacent to an outer circumference of the bracket gear.

10. The angle controlling apparatus of claim 9, wherein the second motor comprises a second rotation shaft, wherein the at least one second gear comprises a second worm wheel, and wherein the second one-way transmission member further comprises:

a second worm coupled to the second rotation shaft of the second motor, wherein the second worm wheel is engaged with the second worm;

a housing gear coupled to the lower housing and configured to transmit power transmitted from the second worm wheel to the lower housing; and a second connection gear engaged with the housing gear, the second connection gear and the second worm wheel having a same rotation axis.

11. The angle controlling apparatus of claim 10, wherein the housing gear comprises a coupling hole passing through from an upper side of the housing gear to a lower side of the housing gear, wherein the lower housing comprises a cylinder guide protruding upward, wherein the cylinder guide comprises a surface facing the housing gear that has a protrusion hole at a position corresponding to the coupling hole, and wherein the angle controlling apparatus further comprises a coupling protrusion received in the coupling hole and the protrusion hole so as to couple the housing gear and the lower housing.

12. The angle controlling apparatus of claim 10, wherein the housing gear is below the base plate, wherein the base plate is rotatably coupled to the bracket and comprises a support protrusion protruding downward, and wherein an outer circumferential surface of the housing gear is adjacent to the support protrusion.

13. The angle controlling apparatus of claim 10, wherein the second worm has a rotation axis in a forward and backward direction, and wherein the second worm wheel has a rotation axis in the vertical direction.

14. The angle controlling apparatus of claim 12, further comprising:

a support cylinder coupled to the base plate, the support cylinder and the lower housing having a same rotation axis;

a first bearing between an outer side of the support cylinder and the housing gear; and a second bearing spaced apart from the first bearing, and between the outer side of the support cylinder and the lower housing.

15. The angle controlling apparatus of claim 11, wherein the bracket comprises a bracket protrusion protruding out of the housing and configured to be coupled to the electronic device, wherein the upper housing has a rotation hole having an angle greater than or equal to an angle at which the bracket protrusion rotates, and wherein the angle controlling apparatus further comprises a cover portion coupled to the bracket protrusion and covering the rotation hole.

16. An angle controlling apparatus comprises:

a projector;

a bracket coupled to the projector;

a motor configured to generate power for rotating the bracket;

a motor driver configured to supply a driving current to the motor;

a one-way transmission member connecting the bracket and the motor, the one-way transmission member being configured to:

transmit the power for rotating the bracket generated by the motor to the bracket, and prevent rotation force of the bracket from being transmitted to the motor, wherein the one-way transmission member comprises at least one gear; and a controller configured to:

perform a driving process for rotating the bracket by controlling the motor driver, perform a driving detection process for detecting a result of the driving process, and perform a standby process for limiting power generation of the motor based on a result of the driving detection process.

17. The angle controlling apparatus of claim 16, wherein the controller is further configured to perform a space detection process for detecting a preset space and rotating the bracket to emit a preset beam when the angle controlling apparatus is located in the preset space.

18. The angle controlling apparatus of claim 16, wherein the controller is further configured to perform a location detection process for rotating the bracket to emit a beam to a set position, when the projector is located in a predetermined space.

19. An angle controlling method of an electronic device, the angle controlling method comprising:

receiving an input, tilting a bracket, coupled to the electronic device, in a vertical direction, by using a motor and a one-way transmission member, based on the received input, wherein the one-way transmission member comprises at least one gear, panning, using the motor, based on the received input, determining whether the tilting and the panning are performed to an input location, and when the tilting and the panning are performed to the input location, performing standby using the one-way transmission member configured to prevent the motor from being moved by an external force and to prevent power consumption for angle control.

20. The angle controlling method of claim 19, wherein the one-way transmission member further comprises a worm coupled to a rotation shaft of the motor, wherein the at least one gear comprises a worm wheel engaged with the worm, and wherein the standby are performed by the worm and the worm wheel.

* * * * *